United States Patent
Whitney

(10) Patent No.: US 11,408,762 B2
(45) Date of Patent: Aug. 9, 2022

(54) ELECTRONIC WEIGHING SCALES WITH USER-CONFIGURABLE CHECK WEIGH FUNCTION AND METHODS OF USING THE SAME

(71) Applicant: Edlund Company, LLC, Burlington, VT (US)

(72) Inventor: Ryan S. Whitney, Essex Junction, VT (US)

(73) Assignee: Edlund Company, LLC, Burlington, VT (US)

( * ) Notice: Subject to any disclaimer, the term of this patent is extended or adjusted under 35 U.S.C. 154(b) by 172 days.

(21) Appl. No.: 16/989,547

(22) Filed: Aug. 10, 2020

(65) Prior Publication Data

US 2021/0048335 A1 Feb. 18, 2021

Related U.S. Application Data

(60) Provisional application No. 62/886,448, filed on Aug. 14, 2019.

(51) Int. Cl.
*G01G 19/62* (2006.01)
*G01G 23/18* (2006.01)
*G01G 19/34* (2006.01)
*G01G 19/414* (2006.01)

(52) U.S. Cl.
CPC ............ *G01G 19/62* (2013.01); *G01G 19/34* (2013.01); *G01G 23/18* (2013.01); *G01G 19/4146* (2013.01)

(58) Field of Classification Search
CPC ... G01G 19/30–306; G01G 19/34–346; G01G 19/414; G01G 19/4146; G01G 23/36–365
USPC ........................................................ 177/177
See application file for complete search history.

(56) References Cited

U.S. PATENT DOCUMENTS

| | | | |
|---|---|---|---|
| 3,655,003 A * | 4/1972 | Yamajima | G01G 19/50 177/245 |
| 4,542,799 A * | 9/1985 | Komoto | G01G 23/18 116/300 |
| 6,456,338 B1 * | 9/2002 | Yuen | H04N 21/47 348/731 |
| 7,256,358 B2 * | 8/2007 | Kesselman | G01G 23/3721 340/666 |
| 8,604,939 B2 * | 12/2013 | Satoh | G01G 19/62 73/1.03 |
| 8,829,365 B1 * | 9/2014 | Wallace | G01G 19/56 177/25.14 |
| 2003/0179097 A1 * | 9/2003 | Collingwood | G01B 5/012 340/686.1 |

(Continued)

*Primary Examiner* — Randy W Gibson
(74) *Attorney, Agent, or Firm* — Downs Rachlin Martin PLLC

(57) ABSTRACT

Electronic weighing scales with check weigh functionality that include user interfaces and programming capability that are designed for both ease of use and configurability. In some examples, electronic weighing scales include check weigh memory buttons configured for one-touch programming that can be used for quickly and easily storing and recalling a target weight. In some examples, electronic weighing scales include check weigh visual indicators designed and configured to conspicuously display a result of a check weigh function weight comparison.

15 Claims, 7 Drawing Sheets

(56) References Cited

U.S. PATENT DOCUMENTS

| | | | | |
|---|---|---|---|---|
| 2004/0026134 A1* | 2/2004 | Waggoner | ............... | G01G 19/62 |
| | | | | 177/160 |
| 2005/0217591 A1* | 10/2005 | Turner | ................. | A01K 5/0114 |
| | | | | 119/51.02 |
| 2007/0108178 A1* | 5/2007 | Jones | ...................... | F24C 15/16 |
| | | | | 219/392 |
| 2008/0218099 A1* | 9/2008 | Newman | .............. | H05B 39/088 |
| | | | | 315/349 |
| 2010/0164738 A1* | 7/2010 | Satoh | ................... | G01G 23/365 |
| | | | | 340/691.3 |

* cited by examiner

ELECTRONIC WEIGHING SCALES WITH USER-CONFIGURABLE CHECK WEIGH FUNCTION AND METHODS OF USING THE SAME

RELATED APPLICATION DATA

This application claims the benefit of priority of U.S. Provisional Patent Application Ser. No. 62/886,448, filed Aug. 14, 2019, and titled Electronic Weighing Scales With User-Configurable Target Weight Function and Methods of Using the Same, which is incorporated by reference herein in its entirety.

FIELD OF THE INVENTION

The present invention generally relates to the field of electronic weighing scales. In particular, the present invention is directed to electronic weighing scales with a user-configurable check weigh function and methods of using the same.

BACKGROUND

Electronic weighing scales with check weigh functionality are used in a variety of applications for quickly and easily determining a difference between a weight of an object and a target weight. In the food services industry, scales with check weigh functionality are useful for portion control which is important for cost control and product consistency. For example, a restaurant employee can use an electronic weighing scale with check weigh functionality when measuring out ingredients according to a recipe to ensure a correct amount of each ingredient is used. This helps ensure an amount of an ingredient in a particular recipe is approximately the same over time and across employees.

SUMMARY OF THE DISCLOSURE

In one implementation, the present disclosure is directed to an electronic weighing scale, which includes a user interface communicatively coupled to the scale, the user interface including at least one check weigh memory button selectable for programming a target weight for a check weigh operation by pressing and holding the at least one check weigh memory button for a predetermined duration of time while an object having the target weight is being weighed by the scale.

In another implementation, the present disclosure is directed to an electronic weighing scale, which includes a user interface communicatively coupled to the scale, the user interface including at least one check weigh memory button, wherein the scale is configured to perform a check weigh operation in response to a user selection of the at least one check weigh memory button, wherein the check weigh operation includes comparing a measured weight of an object to a target weight range; wherein the user interface further includes a check weigh visual indicator configured to emit at least two different colors of light and/or temporal patterns of light according to whether the measured weight is above, below, or within the target weight range.

In yet another implementation, the present disclosure is directed to an electronic foodservice weighing scale for weighing a plurality of different foodstuffs in connection with food preparation. The scale includes a user interface communicatively coupled to the scale, the user interface including a plurality of check weigh memory buttons each independently selectable for programming a target weight for a check weigh operation; wherein the scale is configured to perform the check weigh operation in response to a user selection of one of the plurality of check weigh memory buttons, wherein the check weigh operation includes comparing a measured weight of a foodstuff placed on the scale to a programmed target weight range associated with the user-selected check weigh memory button and corresponding to the type of foodstuff and/or type of recipe ingredient placed on the scale, wherein the target weight range is a programmed target weight plus or minus a programmed target weight tolerance; wherein the scale is designed and configured for the programmed target weight tolerance for each of the plurality of check weigh memory buttons to be independently programmable by a user to thereby allow for tighter target weight tolerances for more expensive ingredients and/or more precise recipes and looser tighter target weight tolerances for less expensive ingredients and/or less precise recipes.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Aspects of the present disclosure include electronic weighing scales with check weigh functionality that include user interfaces and programming capability that are designed for both ease of use and configurability. In some examples, electronic weighing scales include check weigh memory buttons configured with one-touch programming that can be used for quickly and easily storing and recalling a target weight. In some examples, electronic weighing scales include check weigh visual indicators designed and configured to conspicuously and prominently display a result of a check weigh function weight comparison.

Figure 1:
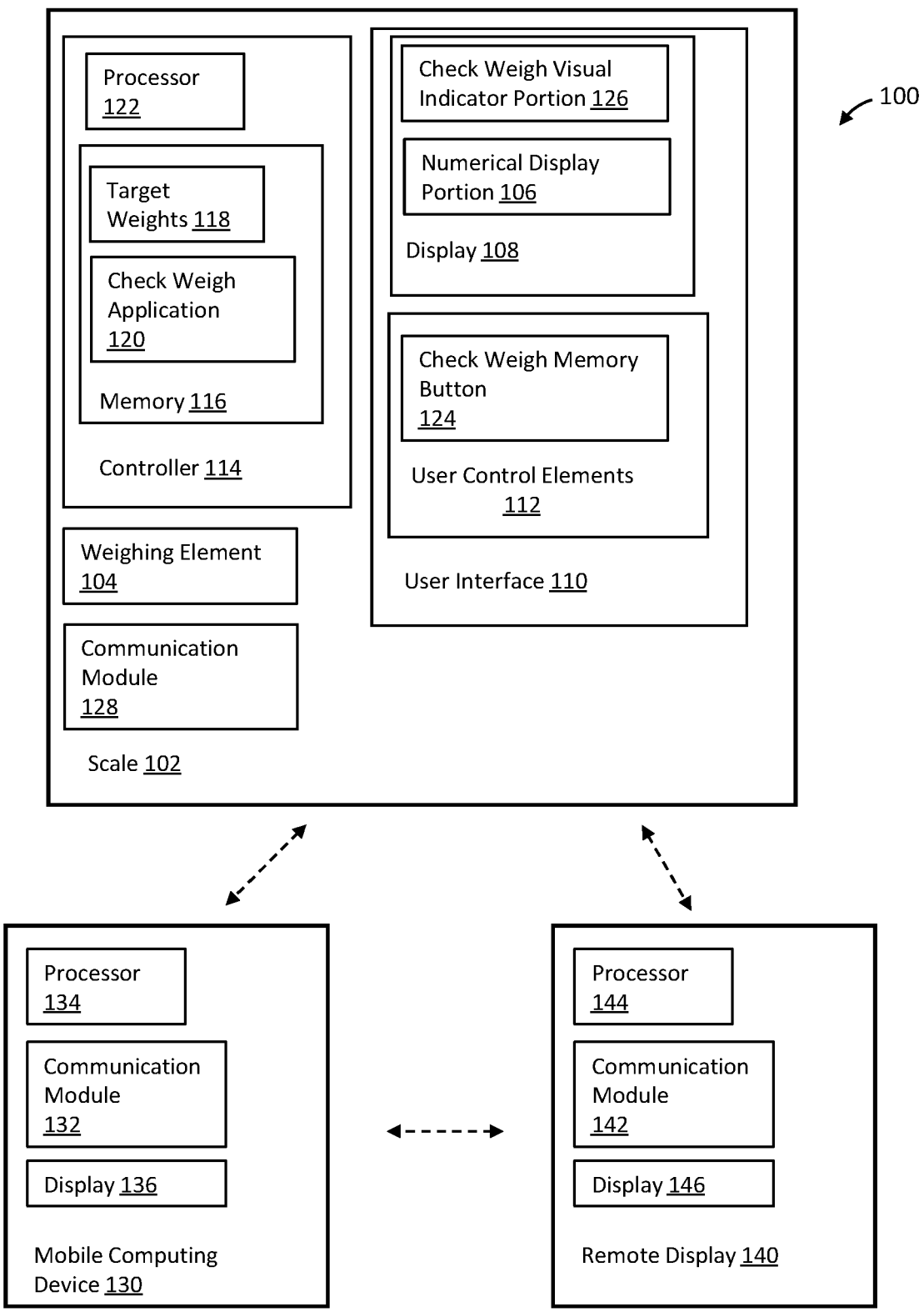
FIG. 1 is a functional block diagram of one example of a weighing system with check weigh functionality.

FIG. 1 is a functional block diagram of one example of a weighing system 100 made in accordance with the present disclosure. While FIG. 1 illustrates an example grouping of functional elements and sub-elements, this is merely by way of example. Electronic weighing scales made in accordance with the present disclosure may include any number of the functional elements illustrated in FIG. 1 in a variety of combinations and may include additional components not illustrated or described that are known in the art of electronic weighing scales. In the illustrated example, system 100 includes a scale 102 that is configured to measure a weight of an object with a weighing element 104 and display the measured weight on a numerical display portion 106 of a display 108. Weighing element 104 may have any construction known in the art for generating a signal according to a sensed weight of an object placed on the scale and may include at least one load cell. Display 108 is part of a user interface 110 that may also include user control elements 112 for controlling and programming the scale. User control elements 112 may include any user control element known in the art, such as hard buttons located on a housing of the scale, soft buttons displayed on display 108 and non-contact sensors such as one or more of a microphone or light sensor that allow a user to send a control signal to scale 102 without contacting the scale, such as with a movement, such as a hand or eye movement and/or an audible control such as by speaking or clapping, etc. Scale 102 includes a controller 114 that includes a memory 116 that is configured to store data such as target weights 118 and one or more applications, such as a check weigh application 120. Controller 114 also includes a processor 122 configured to perform instructions, such as instructions provided by check weigh application 120. Processor 122 may include one or more of any of a variety of processors known in the art, such as a general purpose processor, microcontroller, microprocessor, or application-specific integrated circuit, etc.

In the illustrated example, user interface 110 includes at least one check weigh memory button 124 for utilizing check weigh functionality and display 108 includes a check weigh visual indicator portion 126 for providing a visual indicator to a user for providing one or more indications according to check weigh application 120. The at least one check weigh memory button 124 may include one or more check weigh memory buttons that may be configured for accessing and controlling check weigh functionality. For example, check weigh memory button 124 may be configured to be selected by a user for programming and later accessing a target weight from memory 116. Check weigh visual indicator portion 126 may be configured to provide a visual indication of whether an object being weighed is within a target weight range or above or below the target weight range. In one example, the check weigh visual indicator portion 126 is multi-colored and is configured to display different colored visual indicators according to whether an object being weighed is below, above, or within the target weight range. Check weigh visual indicator portion 126 may also display a constant or time varying visual indicator, such as a flashing light when the object weight exceeds the target weight range and a constant light when within the target weight range. Scale 102 may also provide an auditory indication according to a measured weight of an object, such as a constant or time varying tone when an object is within the target weight range.

In the illustrated example, system 100 also includes at least one mobile computing device, such as a mobile phone, tablet, or laptop communicatively coupled to scale 102, and at least one remote display 140 communicatively coupled to scale 102, wherein one or both of the mobile computing device and remote display can be used to communicate with and/or control scale 102 and display data received from the scale, such as a measured weight and a check weigh indication. Remote display 140 may include a separate housing configured to be positioned proximate scale 102, such as on a wall or table adjacent the scale as is known in the art, which can be useful when measuring a large object such as a large container that obstructs user interface 110. Scale 102 includes a communication module 128 for wired and/or wireless communication with mobile computing device 130 and remote display 140 and the mobile computing device and remote display may similarly include communication modules 132, 142, respectively, as well as processors 134, 144 and displays 136, 146. In one example, mobile computing device 130 and/or remote display 140 may be configured with an application and a user interface that allows a user to provide the same control inputs to scale 102 as can be provided via user interface 110 and display the same information and indications on display 136 and/or 146. For example, a target weight and/or target weight range for the at least one check weigh memory button 124 may be programmed with mobile computing device 130 and/or remote display 140. One or more of communication modules 128, 132, and 142 may be configured for any wireless communication protocol known in the art, such as Bluetooth, ZigBee, Wi-Fi, UWB, etc.

Figure 2:
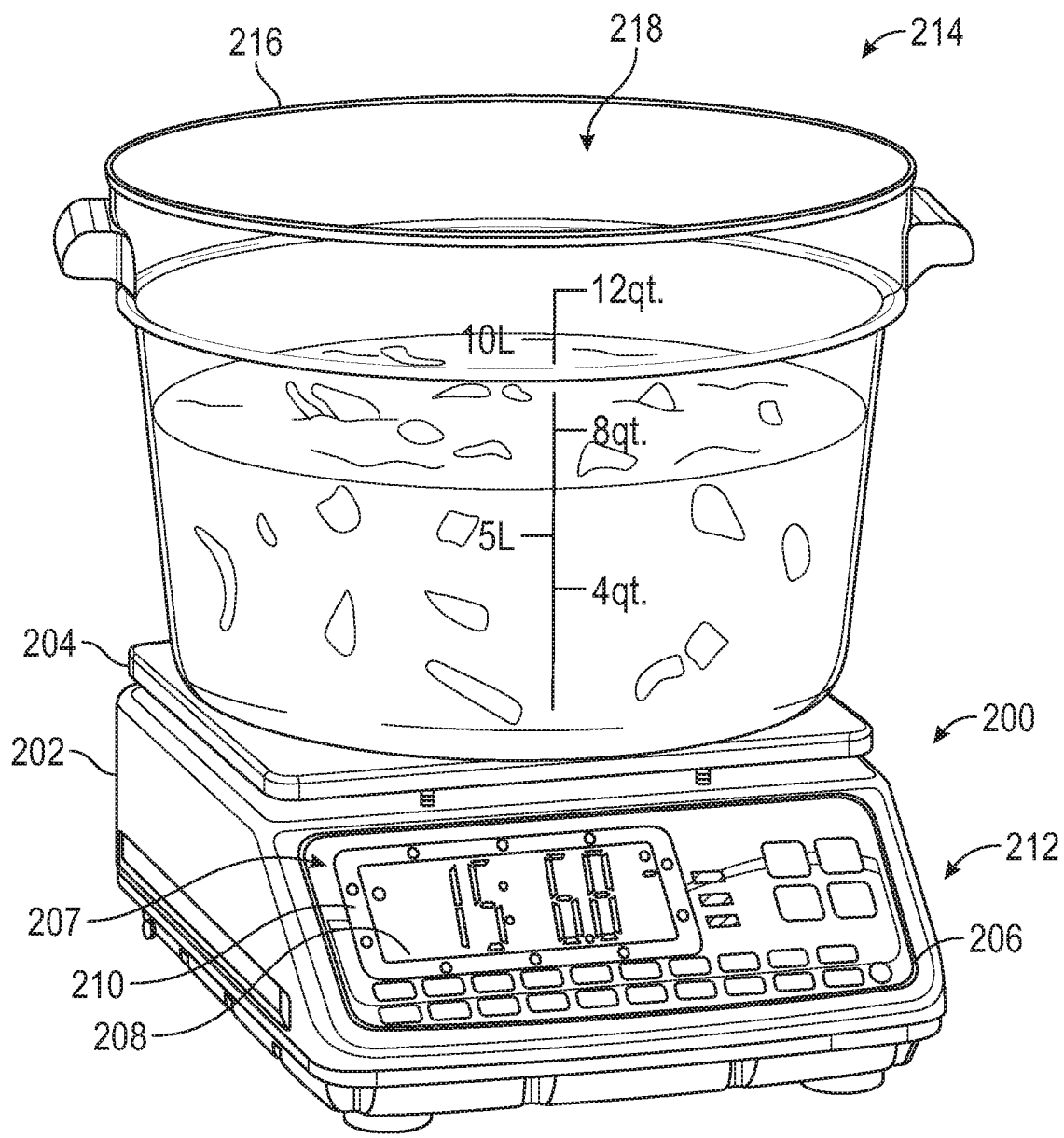
FIG. 2 is a perspective view of an electronic weighing scale with check weigh functionality that is measuring a weight of an object.

FIG. 2 illustrates one example implementation of system 100 in the form of an electronic weighing scale 200 that is configured with check weigh functionality. In the illustrated example, scale 200 is a food safe washdown scale designed and configured for the food service industry and includes a housing 202 that contains and protects one or more internal components, such as controller 114, weighing element 104, and communication module 128 (FIG. 1), as well as a number of other components known in the art of weighing scales. Scale 200 also includes a removable top platform 204, and a user interface 206. User interface 206 is an example implementation of user interface 110 (FIG. 1) and includes a display 207 that includes a numerical display portion 208, a check weigh visual indicator portion 210 and a number of user control elements 212 for controlling the scale. In the illustrated example, an object 214 has been placed on the scale and a weight of the object is being displayed on the numerical display portion 208. In this example, object 214 includes a container 216 and one or more ingredients 218 stored in the container for measurement. During use, ingredient 218 can be incrementally added to container 216 and scale 200 can provide a check weigh indication to continuously notify the user whether the weight of the ingredient is above, below, or within a target weight range.

Housing 202 may have any of a variety of constructions known in the art and can vary according to specific use cases and environments the scale is designed for. By way of non-limiting example, housing 202 and top platform 204 may have a stainless steel construction, such as 304 or 430 grade stainless steel, may be waterproof and dust proof and designed to meet or exceed an ingress protection (IP) rating, such as an IP rating of 67. User interface 206 and display 207 can similarly have any construction and configuration known in the art, for example, display 207 may have an LCD, LED, OLED, or other construction and in one example is a seven segment red LED display.

Figure 3:
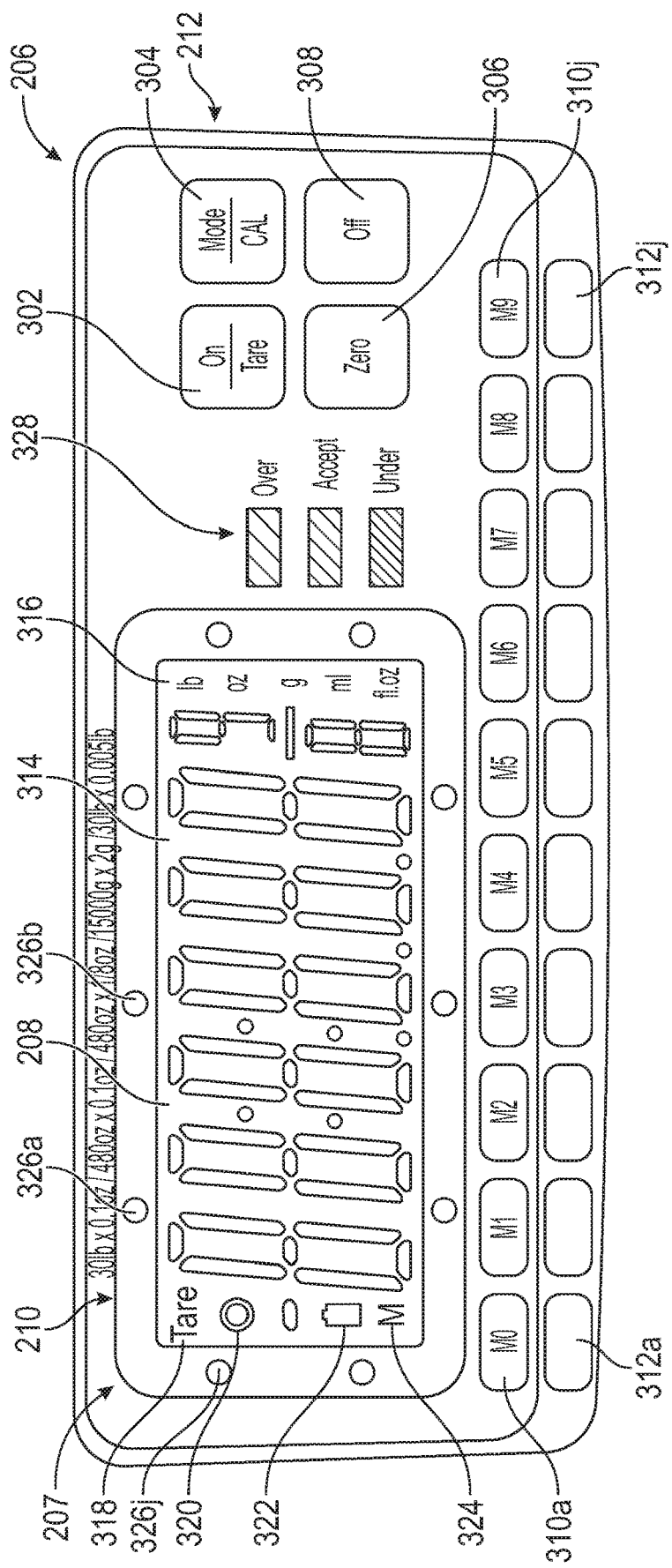
FIG. 3 illustrates the user interface of the electronic weighing scale of FIG. 2.

FIG. 3 illustrates user interface 206 (FIG. 2) at a larger scale than FIG. 2 and without illustration of the surrounding housing 202. In one example, remote display 140 (FIG. 1) may have a user interface with the same or similar configuration as user interface 206. In the illustrated example, user control elements 212 include a number of hard control buttons disposed on housing 202, including an ON/TARE button 302 for turning the scale on and taring, a MODE/CAL button 304 for selecting a unit of measurement, entering a user calibration mode, and used in combination with zero button 306 to adjust a check weigh tolerance range. A ZERO button 306 for setting the scale to zero and exiting from a check weigh mode back to a general weighing mode, and an OFF button 308 for turning the scale off.

User control elements 212 also include a plurality of check weigh memory buttons 310a-310j (only 310a and 310j labeled), here 10 check weigh memory buttons 310 disposed across user interface 206 below numerical display portion 106 and hard control buttons 302, 304, 306, and 308. Check weigh memory buttons 310 are designed and configured to receive a user selection for programming each of the check weigh memory buttons with a unique target weight, unit of measurement, and tolerance range and for selecting any one of the check weigh memory buttons for calling a check weigh function and controlling the check weigh function according to the programmed target weight, unit of measurement and tolerance associated with the selected button. In one example, each of the plurality of check weigh memory buttons 310 are configured as a one-touch multi-functional control elements, wherein the plurality of functions are selectable according to a duration of time the selected check weigh memory button is depressed. In one example, check weigh memory buttons 310 are configured to initiate the programming of a selected button with a target weight when the selected check weigh memory button is depressed for a predetermined duration of time, such as a duration of time in the range of 3 seconds to 5 seconds, and initiate a check weigh mode to compare a measured weight to a pre-programmed target weight associated with a selected button when the selected check weigh memory button is depressed for a duration of time less than the predetermined duration of time. User interface 206 also includes a plurality of erasable spaces 312a-312j located below corresponding check weigh memory buttons 310 (only 312a and 312j labeled) for allowing a user to add an annotation that indicates what a particular check weigh memory button has been configured for, such as a particular ingredient of a recipe.

Numerical display portion 208 includes a seven digit or segment number portion 314 for displaying a measured weight of an object, a units of measurement portion 316 for displaying units of measurement such as pounds (lb) ounces (oz) etc, a tare indicator 318 for indicating when a measured weight has been tared, a weight stable indicator 320 for indicating when the measured weight is stable, a battery indicator 322 for indicating a status of a battery powering the scale and/or when the scale is being powered by a battery rather than house power, and a check weigh mode indicator 324, here an M symbol, for indicating when the scale is in a check weigh mode.

In the illustrated example, check weigh visual indicator portion 210 includes a plurality of light emitting elements 326a-326j (only some labeled), here 10 light emitting elements, that are configured to provide a visual indication when a check weigh function is operating, where the visual indication may vary according to whether an object being weighed is below, above, or within a target weight range. In the illustrated example, check weigh visual indicator portion 210 is an elongate light emitting portion adjacent numerical display portion 208, the elongate light emitting portion having a length that is greater than or equal to a height or width of the numerical display portion. In the illustrated example, check weigh visual indicator portion 210 surrounds numerical display portion 208 and extends around a perimeter of the numerical display portion. In the illustrated example, each light emitting element 326 is a multi-colored light emitting element that is designed to emit visible light in coordination with the other light emitting elements 326. In one example, when a check weigh function is selected and a measured weight is below a target weight range, the light emitting elements 326 can emit a first color light and light sequence, such as a constant yellow light, indicating more weight needs to be added. As additional weight is added, the scale 200 can continuously compare the measured weight to the target weight range and light emitting elements 326 can substantially immediately transition from the first color light and light sequence to a second color light and light sequence when the measured weight falls within the target weight range. In one example, the second color light and light sequence may be a constant green light, or a flashing green light. If the measured weight continues to increase, light emitting elements 326 can substantially immediately transition from the second color light and light sequence to a third color light and light sequence when the measured weight exceeds the target weight range. In one example, the third color light and light sequence may be a constant red light, or a flashing red light. User interface 206 may also include a check weigh visual indicator color key 328 that includes each of the first, second, and third colors printed on a surface of the user interface and text indicating a check weigh status, e.g., over, accept/within range, and under, corresponding to each color.

Check weigh visual indicator portion 210, therefore, provides a conspicuous and easily recognizable and understandable visual check weigh indication. By surrounding numerical display portion 208 with check weigh visual indicator portion 210, a user can easily and simultaneously monitor both the numerical value of the measured weight and the check weigh function status. In one illustrative example, the numerical display portion 208 can display a measured weight of an object in large red numbers and the check weigh visual indicator portion 210 can display a bright yellow light that surrounds and illuminates user interface 206. The user can confidently add an additional amount of an ingredient to the scale until the check weigh visual indicator portion 210 transitions from bright yellow to bright green indicating the correct amount of the ingredient has been placed on the scale. If, however, the user accidentally adds too much and overshoots the target weight range, in one example the check weigh visual indicator portion 210 will immediately and continuously display a flashing bright red light to notify the user the target weight range has been exceeded and will continue to emit a flashing red light until the measured weight is reduced, for example, by removing some of the ingredient from the scale, until the weight falls within the target weight range.

In the illustrated example, check weigh visual indicator portion 210 includes a plurality of discrete light emitting elements 326. In other examples, a check weigh visual indicator portion may include any number of other configurations, such as one or more continuous elongate bars of light that extend along a perimeter of the numerical display portion 208, such as a top, bottom, left, and right side bar, or one continuous bar approximating a rectangular or oval shape. In other examples, a check weigh visual indicator portion may not surround numerical display portion 208 and may include one or more light emitting indicators located in one or more locations of user interface 206 and/or housing 202.

User interface 206, therefore, provides a highly configurable and easily configurable check weigh functionality through the use of a plurality of independently configurable check weigh memory buttons 310. In one example, a user tasked with preparing a dish according to a recipe can quickly and easily measure out the correct amount of each ingredient. For example, a first user might program scale 200 for a lobster roll recipe and program check weigh memory buttons 310a-c for target weights of mayonnaise, celery, and parsley, respectively, in units of, for example, grams, and may selected a first tolerance range of, for example, +/5 grams for each of the memory buttons. Check weigh memory button 310d may be programmed for a target volume of lemon juice in units of, for example, fluid ounces and a separate tolerance range, for example, 0.2 fluid ounces may be entered. And check weigh memory button 310e may be programmed for a target weight of lobster in units of, for example, ounces, and may selected a separate tolerance range of, for example, +/−0.2 ounces. "Mayo," "celery," "parsley," "lemon," and "lobster" may be written in the erasable spaces 312 below the corresponding programmed check weigh memory buttons 310 to easily note and remember what each button is programmed for. In one example, the target weight for each memory button can be programmed by sequentially placing the correct amount of each ingredient on the scale while in a normal weighing mode and simply pressing and holding the corresponding check weigh memory button 310 until display 108 indicates the selected check weigh memory button has been programmed.

Thus, the units of measurement and a tight or wide tolerance range may be selected according to a particular ingredient so that the scale automatically switches to the correct unit of measurement and valuable time is not wasted trying to obtain a precise target weight for a low-cost ingredient, such as mayonnaise, by selecting a wider tolerance while the amount of an expensive ingredient, such as lobster, can be tightly controlled by setting a tighter tolerance. Continuing with the example lobster roll recipe, while in a general weighing mode, a container may be placed on top platform 204, ON/TARE button 302 selected to tare the scale back to zero and the correct amount of mayonnaise added to the container. With the correct amount added and the numerical display portion 208 displaying the target weight of the correct amount and in a desired unit of measurement, a user can simply press and hold check weigh memory button 310a until user interface 206 provides an indication that check weigh memory button 310a has been programmed for mayonnaise, for example, by providing a flashing light visual indication with check weigh visual indicator portion 210. The user may then remove the container of mayonnaise from the scale and repeat the process with each ingredient he or she would like to program the scale for, programming the other check weigh memory buttons 310b-e with the other ingredients for the recipe.

In one example, a second user tasked with preparing a lobster roll can then simply press check weigh memory button 310a and the scale will automatically switch to a check weigh memory mode and be programmed to compare a measured weight to the target weight programmed for check weigh memory button 310a. In one example, each of light emitting elements 326 may also emit a constant yellow light. The user can then quickly measure out the correct amount of mayonnaise. For example, the user might place a container on top platform 204, select ON/TARE button 302 to tare the weight of the container, and then add mayonnaise to the container until the light emitting elements 326 change from yellow to green. The user can then remove the measured amount from the scale and press check weigh memory button 310b, etc. until the correct amount of each ingredient has been measured and then press ZERO button 306 to exit out of the check weigh mode and back to general weigh mode.

Figure 4:
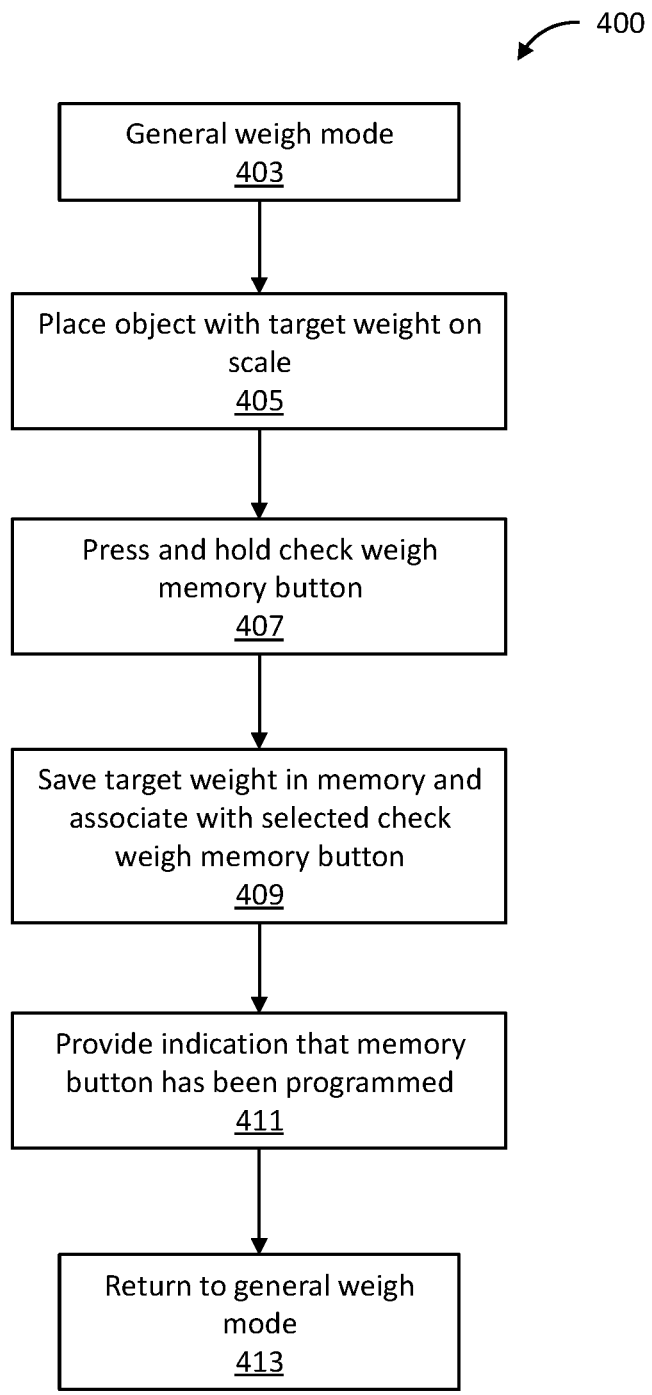
FIG. 4 illustrates an example method for programming an electronic scale with one or more target weights for performing a check weigh operation.

FIG. 4 illustrates an example method 400 for programming an electronic scale, such as scale 102 or 200, with one or more target weights for performing a check weigh operation with a processor according to instructions from a check weigh application, such as processor 122 and check weigh application 120 (FIG. 1). In the illustrated example, at block 403 the scale may be placed in a general weigh mode, such as, for example, by powering the scale on, and at block 405, placing an object having a known and predetermined target weight or volume on the scale. With the scale in the general weigh mode, a numerical display portion of the scale, such as numerical display portion 106 (FIG. 1) or 208 (FIG. 3) may display the measured weight of the item as is typical of a weighing scale. The user may also change a unit of measurement and/or tare the scale as is known in the art to display a desired unit of measurement and eliminate a weight of a container, etc. At block 407, a check weigh memory button, such as the at least one check weigh memory button 124 (FIG. 1) or one of check weigh memory buttons 310 may be selected for programming. In the illustrated example, the selected check weigh memory button can be programmed by simply pressing and holding the memory button while the object is on the scale and the scale is measuring the weight of the object. At block 409, a processor, such as processor 122 of the scale may perform a series of operations according to a check weigh application, such as check weigh application 120 to program the selected check weigh memory button with the weight of the object placed on the scale. In one example, the series of operations may include (a) detecting the selection of the check weigh memory button when the user presses the button; (b) monitoring a duration of time the user has held the selected check weigh memory button in a depressed position; (c) comparing the duration of time to a predetermined value, for example, several seconds, such as a time duration in the range of 3 seconds to 5 seconds; (d) identifying a user instruction to program the selected check weigh memory button when the duration of time exceeds the predetermined value; (e) storing the measured weight of the object located on the scale in memory, for example, in the target weights 118 of memory 116; and (f) associating the saved target weight with the user-selected check weigh memory button. In one example, the stored target weight information may also include a unit of measurement, such as grams or ounces, and a target weight tolerance. In one example, the scale may have a default target weight tolerance than can be modified by the user and in some examples, the user can configure each target weight memory button with a unique target weight tolerance. At block 411, the method may include providing an indication that the memory button has been programmed, for example, providing a visual indication on a user interface, such as user interface 110 or user interface 206, such as flashing the stored target weight in numerical display portion 106 or numerical display portion 208, providing a light indication with check weigh visual indicator portion 126 or check weigh visual indicator portion 210, etc. And at block 413, the scale may then automatically return to the general weigh mode. Example method 400, therefore, provides a simple and easy to use method for programming an electronic weighing scale for a check weigh application that includes simply pressing and holding one of a plurality of check weigh memory buttons located on a user interface communicatively coupled to the scale, resulting in the weighed object's weight being stored in memory and associated with the selected check weigh memory button for future use in connection with utilizing the check weigh function.

Figure 5:
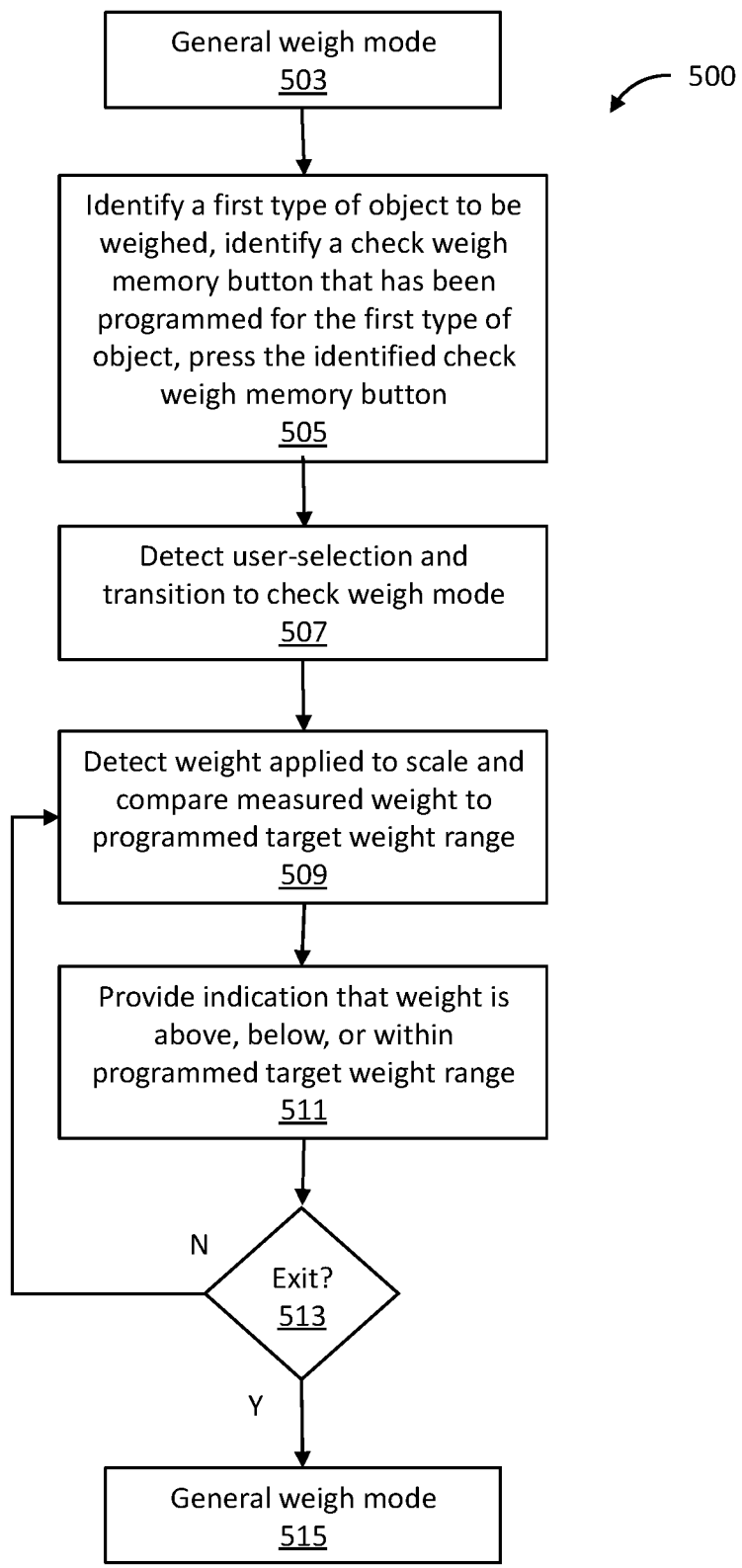
FIG. 5 illustrates an example method for performing a check weigh operation with an electronic scale.

FIG. 5 illustrates an example method 500 for performing a check weigh operation with an electronic scale, such as scale 102 or 200, with a processor according to instructions from a check weigh application, such as processor 122 and check weigh application 120 (FIG. 1). In the illustrated example, at block 503, with the scale in a general weighing mode, at block 505, a user may identify a first type of object to be weighed, such as a type of ingredient for a specific recipe, and identify a check weigh memory button that has been programmed for the first type of object, for example, programmed with the target weight, unit of measurement, and tolerance range for the specific ingredient for a specific recipe, and press the identified button. At block 507, the processor may detect the user's selection and in response to detecting the user selection, execute a check weigh application that may include (a) identifying a target weight, unit of measurement, and tolerance range stored in memory that is associated with the user-selected memory button and (b) displaying a visual indication that the check weigh application has been initiated, which may include one or more of briefly displaying the identified target weight on a numerical display portion of a display screen of the user interface, displaying the stored unit of measurement, displaying a check weigh mode indicator, such as check weigh mode indicator 324, and/or illuminating a check weigh visual indicator, for example, check weigh visual indicator portion 210 indicating whether a currently-measured weight is above, below, or within a target weight range. At block 509 the user may place the first object on the scale, and in response the processor may detect the placement of the weight on the scale, measure the weight of the object with a weighing element and compare the measured weight to the programmed target weight range for the selected check weigh memory button. At block 511 the processor may provide a visual indication of the result of the comparison operation in block 509, for example, provide a visual indication with a check weigh visual indicator, such as check weigh visual indicator portion 126 or check weigh visual indicator portion 210. Any of the check weigh visual indications described herein may be utilized, for example, a first light and light pattern, such as a constant yellow light may be emitted if the measured weight is below the target weight range, a second light and light pattern, such as a constant green light may be emitted if the measured weight is within the target weight range, and a third light and light pattern, such as a flashing red light may be emitted if the measured weight is above the target weight range. At block 513 the processor may determine if the user has exited from the check weigh operation, for example, by determining if the user provided a control signal through a user interface or removed the object from the scale, and if not, the processor may continuously execute blocks 509 and 511 and automatically change the visual indication provided by the check weigh visual indicator as the result of the comparison in block 509 changes until the processor determines an exit signal has been received and returns at block 515 to the general weigh mode.

Referring to FIGS. 4 and 5, as just described, in one example, a scale may include a plurality of check weigh memory buttons and each button may be configured to provide at least two functions that may include (1) programming a target weight and (2) calling a pre-programmed target weight, wherein the user can select between the two functions by varying a length of time a button is held in a depressed position. By pressing and holding a button for longer than a predetermined period of time, the user may configure the selected button for a particular target weight and by pressing and holding for less than the predetermined time, the user can call a check weigh function and a previously-stored target weight range for the selected memory button and then compare a weight of an object to the previously-stored target weight range. In one example, from a general weighing mode a user needs to only press a single button to accomplish either of the two functions, which results in a very simple and user friendly design.

Figure 6:
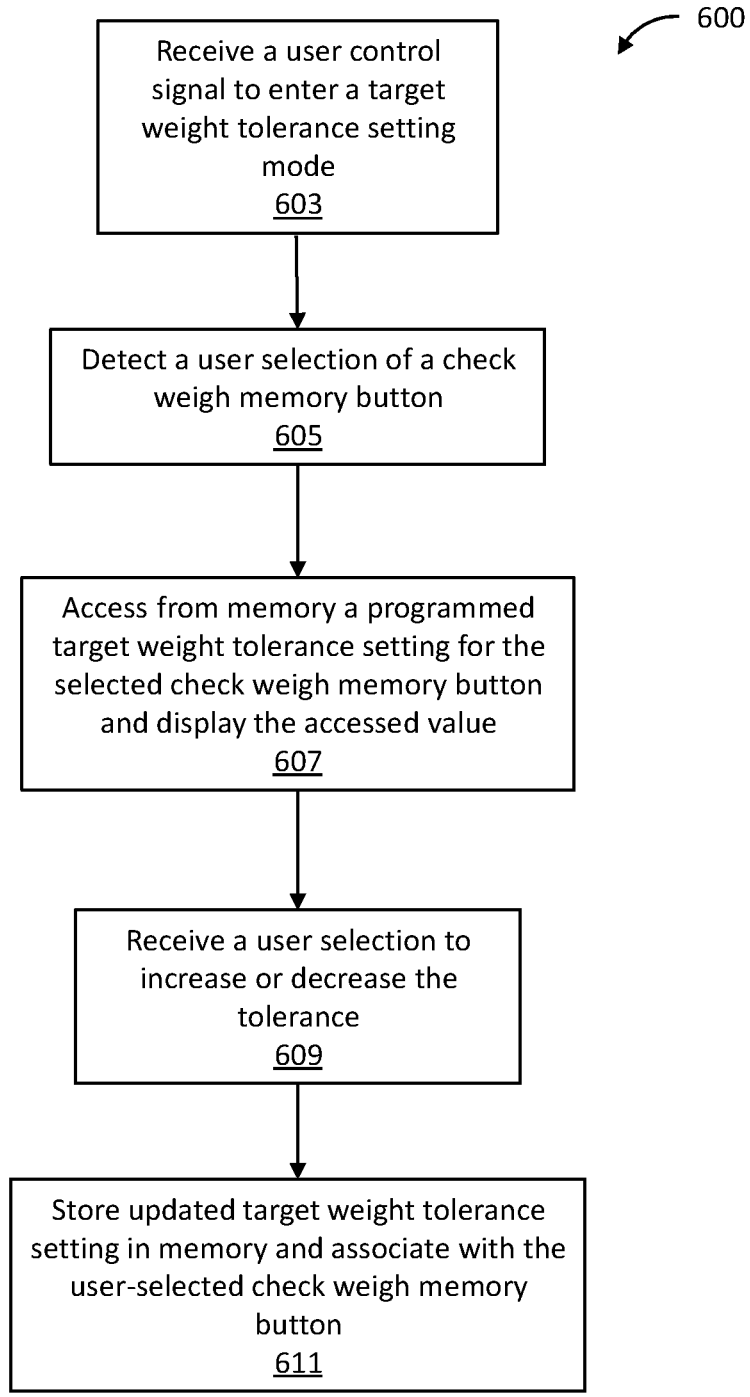
FIG. 6 illustrates an example method for changing a tolerance range for a check weigh operation target weight.

FIG. 6 illustrates an example method 600 for changing a tolerance range for a check weigh operation target weight. In the illustrated example, the method includes, at block 603, receiving a user control signal to enter a target weight tolerance setting mode. A controller of the scale, such as controller 114, may be configured to determine any number of different user inputs indicates such a control signal. For example, the scale may be configured for the user to enter the tolerance setting mode by pressing a check weigh memory button in a particular way, such as by pressing the button a minimum number of times in a row in close succession, such as two or three times. In another example, a tolerance setting mode may be entered by powering the scale off, pressing and holding MODE/CAL button 304 and ZERO button 306 at the same time and then pressing ON/TARE button 302. At block 605, the method may then include detecting a user selection of a check weigh memory button. For example, after entering the tolerance setting adjustment mode, the user may simply press one of the plurality of check weigh memory buttons to program the tolerance setting for that specific button. At block 607, accessing from memory a programmed target weight tolerance setting for the selected check weigh memory button and displaying the accessed value. At block 609, receiving a user selection to increase or decrease the tolerance range. In one example, a user may select one user control element for increasing the tolerance range, such as ON/TARE button 302, and a second user control element to decrease the tolerance range, such as ZERO button 306. And at block 611, storing the updated target weight tolerance setting in memory and associating the stored value with the user-selected check weigh memory button.

Any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
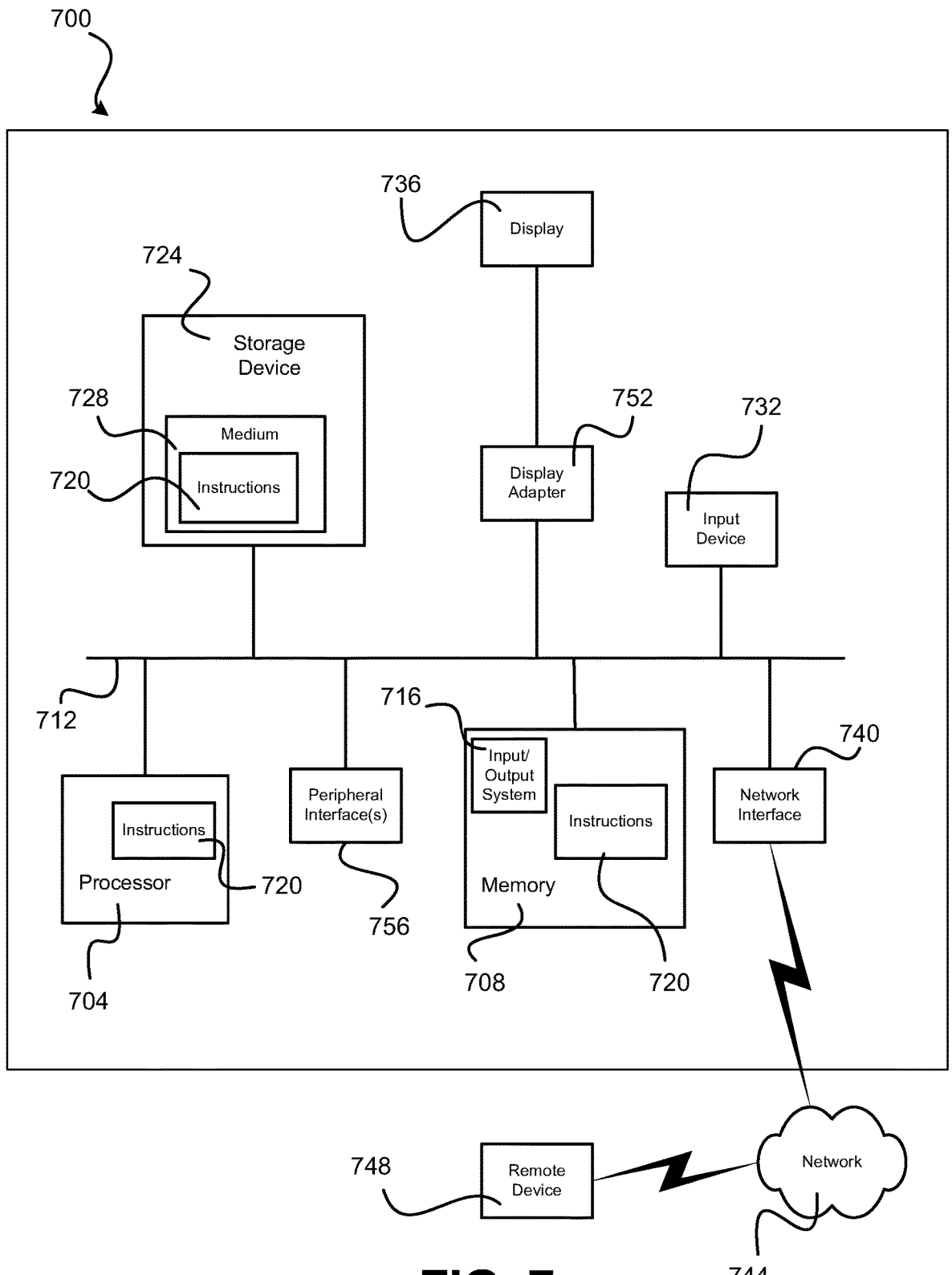
FIG. 7 is a functional block diagram of an example computing system.

FIG. 7 shows a diagrammatic representation of one embodiment of a computing device in the exemplary form of a computer system 700 within which a set of instructions for causing a control system, such as the weighing system of FIG. 1, to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other via wired and/or wireless communication, and with other components, via a bus 712. Bus 712 may include any of several types of bus structures including, but not limited to, a memory bus, a memory controller, a peripheral bus, a local bus, and any combinations thereof, using any of a variety of bus architectures.

Memory 708 may include various components (e.g., machine-readable media) including, but not limited to, a random access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of wired or wireless interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display device 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

What is claimed is:

1. An electronic foodservice weighing scale for weighing a plurality of different foodstuffs in connection with food preparation, the scale comprising:
   a user interface communicatively coupled to the scale, the user interface including a plurality of check weigh memory buttons each independently selectable for programming a target weight for a check weigh operation;
   wherein the scale is configured to perform the check weigh operation in response to a user selection of one of the plurality of check weigh memory buttons, wherein the check weigh operation includes comparing a measured weight of a foodstuff placed on the scale to a programed target weight range associated with the user-selected check weigh memory button and corresponding to the type of foodstuff and/or type of recipe ingredient placed on the scale, wherein the target weight range is a programmed target weight plus or minus a programmed target weight tolerance;
   wherein the scale is designed and configured for the programmed target weight tolerance for each of the plurality of check weigh memory buttons to be independently programmable by a user to thereby allow for tighter target weight tolerances for more expensive ingredients and/or more precise recipes and looser target weight tolerances for less expensive ingredients and/or less precise recipes.

2. The electronic weighing scale of claim 1, wherein the programmed target weight tolerances are configured to be programmed by performing steps that include:
   entering a target weight tolerance setting mode;
   receiving a user selection of one of the plurality of check weigh memory buttons; and
   receiving a user selection to increase or decrease the target weight tolerance setting associated with the user-selected check weigh memory button.

3. The electronic weighing scale of claim 1, wherein the target weight for each of the plurality of check weigh memory buttons can be independently programmed by pressing and holding a selected one of the plurality of check weigh memory buttons for a predetermined duration of time.

4. The electronic weighing scale of claim 3, wherein the user interface includes a plurality of erasable spaces located below a corresponding check weigh memory button for allowing a user to add an annotation that indicates what a particular check weigh memory button has been configured for.

5. The electronic weighing scale of claim 1, wherein each of the plurality of check weigh memory buttons configured as a one-touch multi-functional control element, wherein one of a plurality of functions are selectable according to a duration of time the selected check weigh memory button is depressed, the check weigh memory buttons configured to initiate the programming of the target weight when one of the check weigh memory buttons is depressed for a predetermined duration of time and initiate a check weigh mode to compare a measured weight to a pre-programmed target weight associated with a selected check weigh memory button when the selected check weigh memory button is depressed for a duration of time less than the predetermined duration of time.

6. The electronic weighing scale of claim 1, wherein the scale is configured to perform the check weigh operation in response to a user selection of the plurality of check weigh memory buttons, wherein the check weigh operation includes comparing a measured weight of an object to a target weight range.

7. The electronic weighing scale of claim 6, wherein the user interface includes a check weigh visual indicator configured to emit at least two different colors of light and/or temporal patterns of light according to whether the measured weight is above, below, or within the target weight range.

8. The electronic weighing scale of claim 7, wherein the check weigh visual indicator is configured to emit a first color of light when the measured weight is below the target weight range, a second color of light different than the first color of light when the measured weight is within the target weight range, and a third color of light different than the first and second colors of light when the measured weight is above the target weight range.

9. The electronic weighing scale of claim 6, wherein the user interface includes a numerical display portion configured to display a measured weight of an object and a check weigh visual indicator configured to emit light according to whether the measured weight is above, below, or within the target weight range.

10. The electronic weighing scale of claim 9, wherein the check weigh visual indicator substantially surrounds the numerical display portion.

11. The electronic weighing scale of claim 10, wherein the check weigh visual indicator includes a plurality of discrete light emitting elements spaced around a perimeter of the numerical display portion, including at least one light emitting element on a top, bottom, left, and right sides of the numerical display portion.

12. The electronic weighing scale of claim 9, wherein the check weigh visual indicator is an elongate light emitting portion adjacent the numerical display portion, the elongate light emitting portion having a length that is greater than or equal to a height or width of the numerical display portion.

13. The electronic weighing scale of claim 1, wherein the scale is a washdown foodservice scale.

14. The electronic weighing scale of claim 1, wherein each of the plurality of check weight memory buttons are selectable for programming a target weight for the check weigh operation by pressing and holding one of the check weigh memory buttons for a predetermined duration of time while an object having the target weight is being weighed by the scale.

15. The electronic weighing scale of claim 14, wherein the target weight for each of the plurality of check weigh memory buttons can be independently programmed by pressing and holding a selected one of the plurality of check weigh memory buttons for the predetermined duration of time.

* * * * *

UNITED STATES PATENT AND TRADEMARK OFFICE
CERTIFICATE OF CORRECTION

PATENT NO. : 11,408,762 B2
APPLICATION NO. : 16/989547
DATED : August 9, 2022
INVENTOR(S) : Ryan S. Whitney Page 1 of 1

It is certified that error appears in the above-identified patent and that said Letters Patent is hereby corrected as shown below:

In the Claims

In Column 14, Claim 5, Line 25, the word "is" should be added between the words "buttons" and "configured".

In Column 15, Claim 14, Line 13, the word "weight" should be changed to "weigh".

Signed and Sealed this
Thirteenth Day of September, 2022

Katherine Kelly Vidal
*Director of the United States Patent and Trademark Office*